(12) United States Patent
Zeigler et al.

(10) Patent No.: US 8,621,635 B2
(45) Date of Patent: Dec. 31, 2013

(54) WEB PAGE PRIVACY RISK DETECTION

(75) Inventors: Andrew Zeigler, Seattle, WA (US); Anantha P. Ganjam, Sammamish, WA (US); Mara B. Patton, Issaquah, WA (US); Jessica A. Hitchcock, Kirkland, WA (US); Dean J. Hachamovitch, Bellevue, WA (US); Anthony T. Chor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/193,587

(22) Filed: Aug. 18, 2008

(65) Prior Publication Data
US 2011/0016533 A1 Jan. 20, 2011

(51) Int. Cl.
*H04L 29/06* (2006.01)
(52) U.S. Cl.
USPC ......... 726/25; 726/1; 726/22; 726/26; 726/30
(58) Field of Classification Search
USPC ............................... 726/25, 26; 715/808, 840
See application file for complete search history.

(56) References Cited

U.S. PATENT DOCUMENTS

| | | | |
|---|---|---|---|
| 6,571,279 B1 * | 5/2003 | Herz et al. | 709/217 |
| 6,959,420 B1 | 10/2005 | Mitchell | |
| 2003/0182417 A1 * | 9/2003 | Hasunuma | 709/223 |
| 2003/0231203 A1 | 12/2003 | Gallella | |
| 2004/0075686 A1 * | 4/2004 | Watler et al. | 345/749 |
| 2004/0158429 A1 * | 8/2004 | Bary et al. | 702/183 |
| 2005/0015512 A1 * | 1/2005 | Kale et al. | 709/245 |
| 2005/0138426 A1 * | 6/2005 | Styslinger | 713/201 |
| 2006/0253584 A1 * | 11/2006 | Dixon et al. | 709/225 |
| 2007/0162396 A1 | 7/2007 | Goldman | |
| 2007/0199051 A1 | 8/2007 | Parikh | |
| 2008/0005778 A1 * | 1/2008 | Chen et al. | 726/1 |
| 2008/0033961 A1 | 2/2008 | Berglund | |

(Continued)

FOREIGN PATENT DOCUMENTS

| | | |
|---|---|---|
| JP | 2007128119 | 5/2007 |
| KR | 20040013180 | 2/2004 |

OTHER PUBLICATIONS

Bruckner, et al., "MozPETs—a Privacy enhancedWeb Browser", retrieved at <<http://www.ito.tu-darmstadt.de/publs/pdf/BruecknerVoss__Mozpets.pdf>>, Jul. 15, 2008, pp. 4 (provided in IDS dated Nov. 28, 2008).*

(Continued)

*Primary Examiner* — Brandon Hoffman
*Assistant Examiner* — Thomas C Lauzon
(74) *Attorney, Agent, or Firm* — Wolfe-SBMC

(57) ABSTRACT

Various embodiments enable detection of third party content sources that may pose a privacy risk to a user. In at least some embodiments, webpages navigated to via a browser can be processed to identify third party content sources that provide content for the webpages. Data may be stored to relate the third party content sources to webpages in which the third party content is encountered. The data may then be analyzed to determine when a particular third party is in a position to observe browsing habits of a user. Responsive to determining a privacy risk, notification may be output in a variety of ways to inform a user of potentially risky content. In at least some other embodiments, notification can be made by way of a user interface instrumentality that is automatically presented to a user to inform the user of a potentially risky third party content source.

20 Claims, 6 Drawing Sheets

(56) References Cited

U.S. PATENT DOCUMENTS

| | | | |
|---|---|---|---|
| 2008/0120533 A1 | | 5/2008 | Lazier et al. |
| 2009/0240835 A1* | | 9/2009 | Adelman et al. .............. 709/245 |
| 2010/0024042 A1* | | 1/2010 | Motahari et al. ............... 726/26 |

OTHER PUBLICATIONS

P. Vogt, F. Nentwich, N. Jovanovic, E. Kirda, C. Kruegel, and G. Vigna. Cross-Site Scripting Prevention with Dynamic Data Tainting and Static Analysis. In Proceeding of the Network and Distributed System Security Symposium (NDSS '07), Feb. 2007.*

"PCT Search Report and Written Opinion", Application No. PCT/US2009/053851, (Mar. 22, 2010),13 pages.

"SpyProxy:Execution-based Detection of Malicious Web Content", http://www.usenix.org/events/sec07/tech/full_papers/moshchuk_new/moshchuk_new_html/index.html, 26 pgs.

"Sunbelt Software's Definition of Potentially Unwanted Installaions (PUI)", http://research.sunbelt-software.com/Listing_Criteria.aspx, (Jun. 30, 2005),4 pgs.

"Tips for Cleaning & Securing Your", http://www.stopbadware.org/home/security, 7 pgs.

"Web Content Security", Retrieved from http://www.windowsecurity.com/software/Web-Content-Security/name/ on Jul. 15, 2008, (Jul. 4, 2004),5 pgs.

"PartyPoker", Retrieved from http://www.spywareremove.com/removePartyPoker.html on Jul. 15, 2008, 3 pgs.

"MozPETs—a Privacy enhancedWeb Browser", not listed, 4 pgs.

Moshchuk, et al., "SpyProxy: Execution-based Detection of Malicious Web Content", retrieved at <<http://www.usenix.org/events/sec07/tech/full_papers/moshchuk_new/moshchuk_new_html/index.html, Jul. 15, 2008, pp. 26.

"Sunbelt Software's Definition of Potentially Unwanted Installations (PUI)", retrieved at <<http://research.sunbelt-software.com/Listing_Criteria.aspx, Jul. 15, 2008, pp. 4.

"Tips for Cleaning & Securing Your Website", retrieved at <<http://www.stopbadware.org/home/security, Jul. 15, 2008, pp. 7.

"Web Content Security", retrieved at <<http://www.windowsecurity.com/software/Web-Content-Security/name/, Jul. 15, 2008, pp. 5.

"PartyPoker", retrieved at <<http://www.spywareremove.com/removePartyPoker.html>>, pp. 3.

Bruckner, et al., "MozPETs—a Privacy enhancedWeb Browser", retrieved at <<http://www.ito.tu-darmstadt.de/publs/pdf/BruecknerVoss_Mozpets.pdf, Jul. 15, 2008, pp. 4.

"Foreign Office Action", Chinese Application No. 200980132570.3, (Jan. 18, 2012),8 pages.

"Foreign Office Action", Chinese Application No. 200980132570.3, (Jul. 3, 2012).

"Foreign Office Action", Chinese Application No. 200980132570.3, (Jan. 14, 2013), 8 pages.

* cited by examiner

WEB PAGE PRIVACY RISK DETECTION

BACKGROUND

Webpages can contain many different types of content that can be useful for a user. A typical webpage can be composed of a variety of native content (e.g., content directly from a primary provider of the webpage), as well as third party content from one or more third party content sources. For example, a news webpage can be configured to contain native content, such as news articles, links, and pictures from a news provider, and third party content, such as advertisements, links, plug-ins (sports ticker, weather tracker, etc.), and so forth from various third party content sources.

A user who navigates a browser to view the news webpage is aware of the interaction with the news webpage. However, the user may not be aware of interaction that also occurs with third party content sources that provide content for the news webpage. Moreover, a third party content source that is accessed through multiple webpages may be in a position to observe the browsing habits of a user. Thus, third party content sources may present a privacy risk to the user. Yet, without knowledge of the interaction with third party content sources, the user is not in a position to take action with respect to these third party content sources that may be able to observe the user's browsing habits.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable detection of third party content sources that may pose a privacy risk to a user. In at least some embodiments, webpages navigated to via a browser may be processed to identify third party content sources that provide content for the webpages. Data may be stored to relate the third party content sources to webpages in which the third party content is encountered. The data may then be analyzed to determine when a particular third party is in a position to observe browsing habits of a user. In one example, a privacy risk is determined when a number of webpages related to the same content and/or third party content source exceeds a configurable threshold value. Responsive to determining a privacy risk, notification may be output in a variety of ways to inform a user of potentially risky content.

In at least some other embodiments, notification can be made by way of a user interface instrumentality that is automatically presented to a user to inform the user of a potentially risky third party content source. The user interface instrumentality can, in some instances, reside in the form of an alert message that is automatically presented when risky third party content for a webpage is encountered. Further, the user interface instrumentality can, in some instances, incorporate one or more selectable portions that are selectable to enable a user to access functionality to take various actions, such as to block or allow content from the third party content source.

BRIEF DESCRIPTION OF THE DRAWINGS

The same numbers are used throughout the drawings to reference like features.

DETAILED DESCRIPTION

Overview

Various embodiments enable detection of third party content sources that may pose a privacy risk to a user. In at least some embodiments, webpages navigated to via a browser may be processed to identify third party content sources that provide content for the webpages. Data may be stored to relate the third party content sources to webpages in which the third party content is encountered. The data may then be analyzed to determine when a particular third party is in a position to observe browsing habits of a user. In one example, a privacy risk is determined when a number of webpages related to the same content and/or third party content source exceeds a configurable threshold value. Responsive to determining a privacy risk, notification may be output in a variety of ways to inform a user of potentially risky content.

In at least some other embodiments, notification can be made by way of a user interface instrumentality that is automatically presented to a user to inform the user of a potentially risky third party content source. The user interface instrumentality can, in some instances, reside in the form of an alert message that is automatically presented when risky third party content for a webpage is encountered. Further, the user interface instrumentality can, in some instances, incorporate one or more selectable portions that are selectable to enable a user to access functionality to take various actions, such as to block or allow content from the third party content source.

In the discussion that follows, a section entitled "Operating Environment" describes but one environment in which the various embodiments can be employed. Following this, a section entitled "Privacy Risk Detection Examples" describes embodiments in which third party content in a webpage can be identified and privacy risks can be determined. Next, a section entitled "Risk Notification Examples" describes embodiments in which notification can be output to notify a user of third party content that is potentially risky to the user. Last, a section entitled "Example System" is provided and describes an example system that can be used to implement one or more embodiments.

Operating Environment

Figure 1:
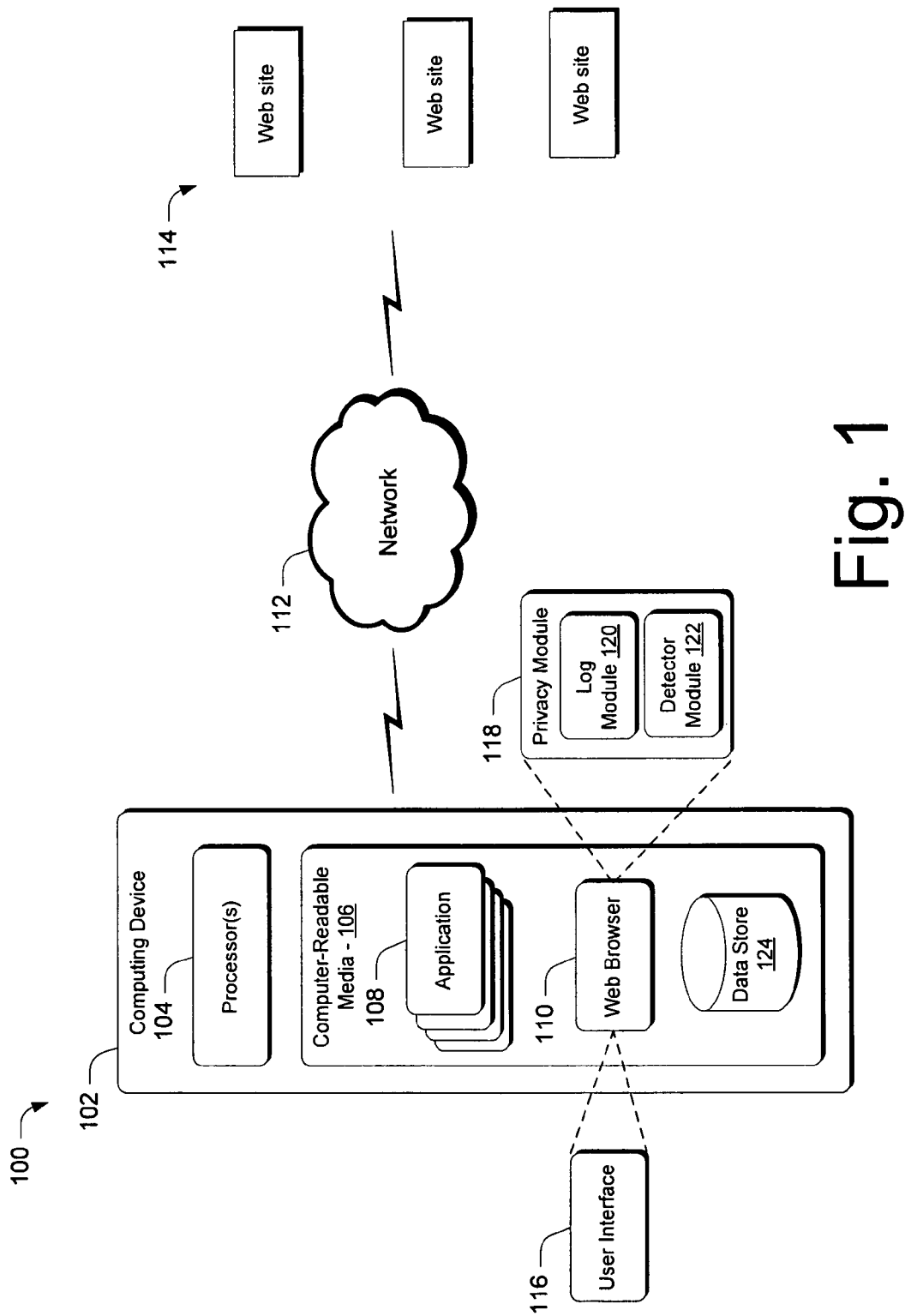
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as, by way of example and not limitation, reader applications, e-mail applications, instant messaging applications, and a variety of other applications.

Computing device 102 includes an application 108 in the form of a Web browser 110 that provides functionality available to a user of the computing device 102 to navigate over a network 112, such as the Internet, to one or more websites 114 from and to which content can be received and sent. The web browser 110 can operate to provide a variety of user interfaces 116 through which the user may interact with content that is available from the one or more websites 114.

Websites 114 may include primary content sources and third party content sources. As used herein, primary content sources refer to sources of content from within a website 114 and/or related domain to which a user has affirmatively and/or intentionally navigated. Primary content sources have a close association to the domain of a Uniform Resource Indicator (URI) to which a browser has been directed by user, and/or may have the same provider as the provider of the domain. As used herein, third party content sources are content sources that are other than the primary content sources. In other words, third party content sources are sources from outside of the domain to which a browser has been directed by user, and generally may have a different provider than the provider of the domain.

Further, Web browser 110 can include or otherwise make use of a privacy module 118 that operates as described above and below. The privacy module 118 is representative of a variety of privacy features that can be provided to a user when interacting with the one or more websites 114. For example, privacy module 118 can enable identification of third party content sources that provide content in webpages obtained from the websites 114. Privacy module 118 can also determine privacy risks presented by the third party content sources. In particular, the privacy module 118 can operate to determine when a third party content source is in a position to observe browsing habits of a user of the computing device 102.

In an embodiment, functionality of the privacy module 118 may be provided by way of various sub-modules. In the example of FIG. 1, privacy module 118 is illustrated as including a log module 120 and a detector module 122. Log module 120 is representative of functionality to identify third party content in webpages. Log module 120 can also maintain a database to log or otherwise compile data describing interaction of Web browser 110 with websites 114 and associated content. A variety of data compiled by way of the log module 120 can be maintained in a data store 124 as illustrated in FIG. 1.

Detector module 122 is representative of functionality operable to process data compiled by the log module 120 in a variety of ways. Through this processing, detector module 122 can monitor interaction of web browser 110 with third party content sources and determine when a particular third party content source poses a potential privacy risk. Detector module 122 can further operate to cause output of notification responsive to determining that third party content is potentially risky.

The computer-readable media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of embodiments in which privacy risks associated with content from third party content sources can be detected.

Privacy Risk Detection Examples

In one or more embodiments, techniques may be employed to identify third party content sources associated with content appearing on a webpage. As noted above, various data can be compiled and stored to relate third party content sources to webpages in which content from the third party content sources is encountered. The data relating third party content sources to webpages may be processed to detect those third party content sources that may pose a privacy risk.

Figure 2:
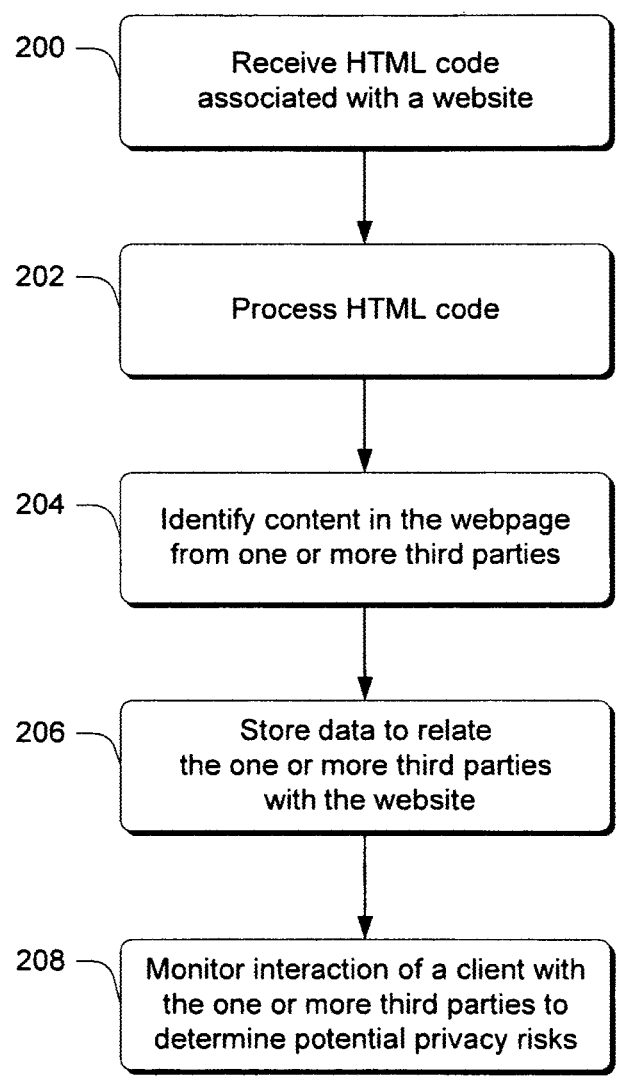
FIG. 2 is a flow diagram that describes steps in a method in accordance with one or more embodiments.

FIG. 2 is a flow diagram that describes steps in a method in accordance with one or more embodiments. The method can be performed in connection with any suitable hardware, software, firmware, or combination thereof. In at least some embodiments, the method can be performed by a suitably-configured Web browser such as the Web browser 110 described above in FIG. 1.

Step 200 receives HTML code associated with a webpage. This step can be performed when a Web browser navigates to a particular webpage. Step 202 processes the HTML code and step 204 identifies content in the webpage from third party content sources. This step can be performed in any suitable way. For example, the HTML code associated with the webpage can identify content that is to be included in the webpage to which a user can subscribe. One example of how this can be done is through HTML tags, URIs, and other suitable identifiers of content embedded in the HTML code. Identification can occur whenever processing of the HTML code results in requests to download content for inclusion in the webpage.

As noted above, content in a webpage may be provided from both primary content sources and third party content sources. Thus, the identification in step 204 may include distinguishing between primary content sources and third party content sources. In one or more embodiment, a comparison may be made between a path of requested content and a path of the webpage in which the content appears to determine whether the source of the requested content is within the same domain and/or has the same provider as the webpage to which the Web browser is directed. When the domain and/or provider are determined to be different, the requested content may be identified as content from a third party content source.

Responsive to identifying one or more third party content sources, step 206 stores data to relate the one or more third party content sources to the website. Thereafter, step 208 monitors interaction with the one or more third party content sources to determine potential privacy risks.

For instance, based on identification of content from third party sources, data may be compiled and stored in a database, such as a log within data store 124 of FIG. 1. When a third party content source is identified for the first time, a record for the third party content source may be added to the database. The record relates the third party content source to the website in which content from the third party content source was encountered. Thereafter, the record in the database may be updated each time the third party content source is encountered by the Web browser to reflect the additional encounters in perhaps other webpages to which the browser is navigated.

In one or more embodiments, the records maintained in the database operate to log or otherwise track how many times a third party content source has been encountered with a different website/domain. For instance, a record for a particular third party content source may include a counter field that may be incremented each time the particular third party content source is encountered with a different website and/or domain. The number of times a third party content source has been encountered can be a basis for determining how much of a privacy risk the third party content source presents to a user.

Consider a particular third party content source that is encountered in a webpage output via Web browser 110. When the third party content source is encountered, Web browser 110, such as through privacy module 118, can reference data store 124 to determine if a record exists for the third party content source. Assuming a record already exists, Web browser 110 may further operate to determine whether the third party content source has already been related to the webpage. Assuming the third party content source has not already been related to the webpage, the Web browser 110 can update the record to reflect the additional encounter and can also increment a counter associated with the record to indicate the number of times the third party content source has been encountered with different websites and/or domains.

In one or more embodiments, a Web browser determines the risk presented by a third party content source based at least in part upon a number of times the third party content source has been encountered. Incrementing a counter as just described is one example of how the Web browser can arrive at the number of times. For example, if a content item "source1.xyz.foo.js" is encountered at both site A and site B, then the source of "source1.xyz.foo.js" may have sufficient information to know at least that the Web browser has visited sites A and B. Other information, such as an IP address, browser settings, preferences and so forth can also be exchanged through interaction with the third party source. In this example, the counter value would be set to "2" corresponding to the number of different sites at which "source1.xyz.foo.js" was encountered.

In one or more embodiments, the Web browser can implement configurable threshold values that can be used to relate the counter value (e.g., the number of different sites) to one or more levels of perceived risk. A single threshold value or multiple value ranges associated with different risk levels may be employed. By way of example and not limitation, the following Table 1 provides one example of multiple value ranges associated with different risk levels that may be employed to determine a perceived risk level.

TABLE 1

Perceived Risk Level vs. Third Party Encounters

| Risk Level | Number of Encounters |
|---|---|
| Low | 0-5 |
| Medium | 6-10 |
| High | 11 or more |

Thus, in the ways described above and below, a suitably-configured Web browser, such as the Web browser 110 described above in FIG. 1, can monitor interaction with third party content sources and determine privacy risks associated with the third party content sources. The following discussion of FIG. 3 provides additional examples of techniques that may be employed to determine privacy risks associated with the third party content sources.

Figure 3:
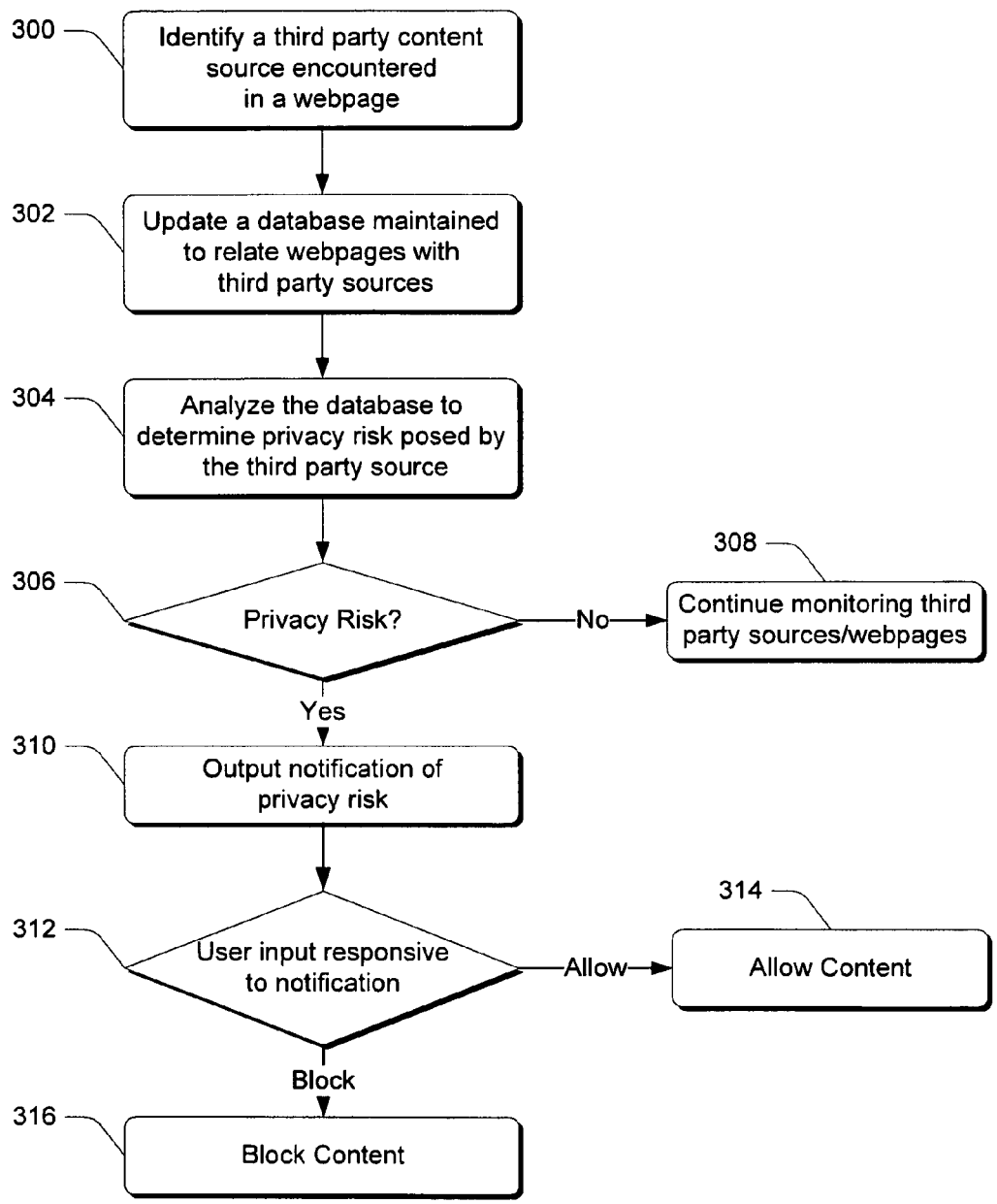
FIG. 3 is a flow diagram that describes steps in a method in accordance with one or more embodiments.

FIG. 3 is a flow diagram that describes steps in a method in accordance with one or more embodiments. The method can be performed in connection with any suitable hardware, software, firmware, or combination thereof. In at least some embodiments, the method can be performed by a suitably-configured Web browser such as the Web browser 110 described above in FIG. 1.

Step 300 identifies a third party content source encountered in a webpage. This step can be performed in any suitable way. This step can be performed when a Web browser processes HTML code of particular webpage and generates requests to download content from one or more content sources. For example, the HTML code associated with the webpage can identify content that is to be included in the webpage. One example of how this can be done is through HTML tags, URIs, and other suitable identifiers of content embedded in the HTML code. In at least some embodiments, identification of third party content can alternatively occur after a webpage has been rendered. This technique can be employed to avoid consuming processing resources during rendering of webpages and corresponding performance losses.

Step 302 updates a database maintained to relate webpages to third party content sources. In particular, the Web browser, such as through log module 120 of FIG. 1, can update a record in the database corresponding to the third party content source to reflect that the third party content source has been encountered with the webpage. If record does not already exist for the third party content source, a new record can be created.

Thereafter, step 304 analyzes the database to determine a privacy risk posed by the third party content source. In particular, the Web browser, such as through detector module 122 of FIG. 1, can analyze data in the database in a variety of ways to determine whether a third party content source is in a position to observe a user's browsing habits.

In one or more embodiments, analyzing the database can include merging of similar items in the database. A variety of logic may be applied to merge similar items. Merging items may be performed on the basis of path data for different content items. By way of example and not limitation, path data may include URIs, file names, query strings, parameters, primary domain names, and combinations thereof. A comparison of path data for two content items may be made. When the content items are sufficiently similar, the data for the content items may be grouped together to determine whether there is a third party content source that presents a privacy risk.

For example, consider one third party content item having a path of http://www.tracku.com/1234/foo.js and a second third party content item having a path of http://www.tracku.com/5678/foo.js. In this example, the domain "www.tracku.com" and file names "foo.js" are identical. Based on these similarities, logic applied to analyze the database can cause the data for the two items to be merged. In particular, both content items can be associated with the same third party content source, e.g., "www.tracku.com". A variety of different techniques and algorithms to merge similar items are contemplated.

In one or more embodiments, analyzing the database can also include determining the number of times a third party content source and/or item has been encountered. One example of determining the number of times is by way of incrementing a counter field each time a third party content source is encountered with a different website and/or domain, as previously described. Generally, the higher the count, the greater the potential privacy risk. A variety of algorithms are contemplated that are suitable to arrive at the number of times a third party content source and/or item has been encountered. By way of example and not limitation, one example risk detection algorithm that can be employed is provided in Table 2 as follows:

TABLE 2

Example Risk Detection Algorithm

Given a database d, a primary website f, and a third party content
source t that is identified as providing content to the primary website f,
data may be stored in d that relates f and d as a pair (f,t):
    Select all third parties from d where tracker.FQDN equals t.FQDN
        If third parties is empty, add t as a new item to d, with a count of
        1.
        Else
            For each third party T in third parties
                If T matches the regex "t.FQDN\/.*\/t.filename"
                    Set Boolean match equal to false
                    For each primary website F in T.PrimaryWebSites
                        If f equals F
                          Set match equal to true
                    If match equals false
                        Add f to T. PrimaryWebSites
                        Increment T. PrimaryWebSites
                Else discard (f,t) and quit
            Else discard (f,t) and quit Based on analysis of the database, step 306 determines whether a third party content source poses a privacy risk. One example of how this can be done is through one or more threshold values as discussed previously. When in step 306 a sufficient privacy risk is not determined, step 308 continues monitoring of webpages and/or third party sources to detect privacy risks. For instance, when additional webpages are rendered via a Web browser, various techniques described above and below may be employed to detect privacy risks from third party content sources encountered in these webpages.

When in step 306 a sufficient privacy risk is determined, step 310 outputs a notification of the privacy risk to inform a user. Any suitable notification can be used to inform the user of a risk posed by a third party content source. In one or more embodiments notification can be made by way of a user interface instrumentality that is automatically presented to a user to inform the user of a third party content source that has been determined to be potentially risky. The user interface instrumentality can, in at least some embodiments, be output in the form of a pop-up window or dialog box that is automatically output responsive to detection of a potentially risky third party content source. In other embodiments, the notification may be output in the form of a menu bar item that can appear in a menu bar of a Web browser. Further discussion of some suitable example notifications that can be output may be found below in a section entitled "Risk Notification Examples".

In one or more embodiments, a user interface instrumentality to output a notification can include one or more selectable portions to enable a user to take action with respect to a third party content source. For example, notification in the form of a pop-up window or dialog box can include one or more selectable buttons or other suitable controls that are selectable by a user to enable a user to access functionality operable to block and/or allow content from the third party content source. Thus, through interaction with the user interface instrumentality, a user may provide input to initiate various actions with respect to potentially risky third party content sources.

Step 312 determines user input that can be received responsive to a notification of a potentially risky third party content source. When user input is received to allow the third party content source, step 314 allows the third party content source content. Likewise, when user input is received to block the third party content source, Step 316 blocks content from the third party content source.

One way that allowing and blocking of content can occur is through one or more control lists that describe content sources that are to be allowed and blocked by a Web browser. Control lists can be updated based upon user input that is received to indicate whether a particular third party content source is to be blocked or allowed. In one or more embodiments, the control lists can be populated by the user according to the browsing habits of the user. Accordingly, the time and expense to create and maintain pre-populated control lists as employed in some traditional systems can be avoided. Control lists in accordance with the described embodiments can be maintained in a database, such as in the data store 124 depicted in FIG. 1. When rendering content, a Web browser can reference and utilize the control lists and act in accordance with allowed and/or blocked content specified in the control lists.

While user input to allow or block content has been described in the foregoing example, it is contemplated that various other user input and corresponding actions can be employed with respect to third party content sources detected as potentially risky. By way of example and not limitation, other example actions that can be initiated through suitable user input can include: obtaining more information regarding a third content, setting a reminder regarding the content, accessing a social network for recommendations, and/or ignoring a notification (e.g., taking no further action).

Having described example embodiments in which detection of potentially risky third party content can occur, consider now other embodiments in which notification of potentially risky third party content source can be output to a user. Specifically, in the embodiments described just below, example user interfaces are described to provide tangible examples for the benefit of the reader of risk notifications that can be output responsive to detection of potentially risky third party content sources.

Risk Notification Examples

As previously discussed, a Web browser can implement various techniques described above and below to detect a third party content source that may be in a position to observe browsing habits, e.g., a potentially risky third party content source. Responsive to this detection, notification can be output to inform a user of the potentially risky third party content source, and to enable the user to take action with respect to the third party content source.

Figure 4:
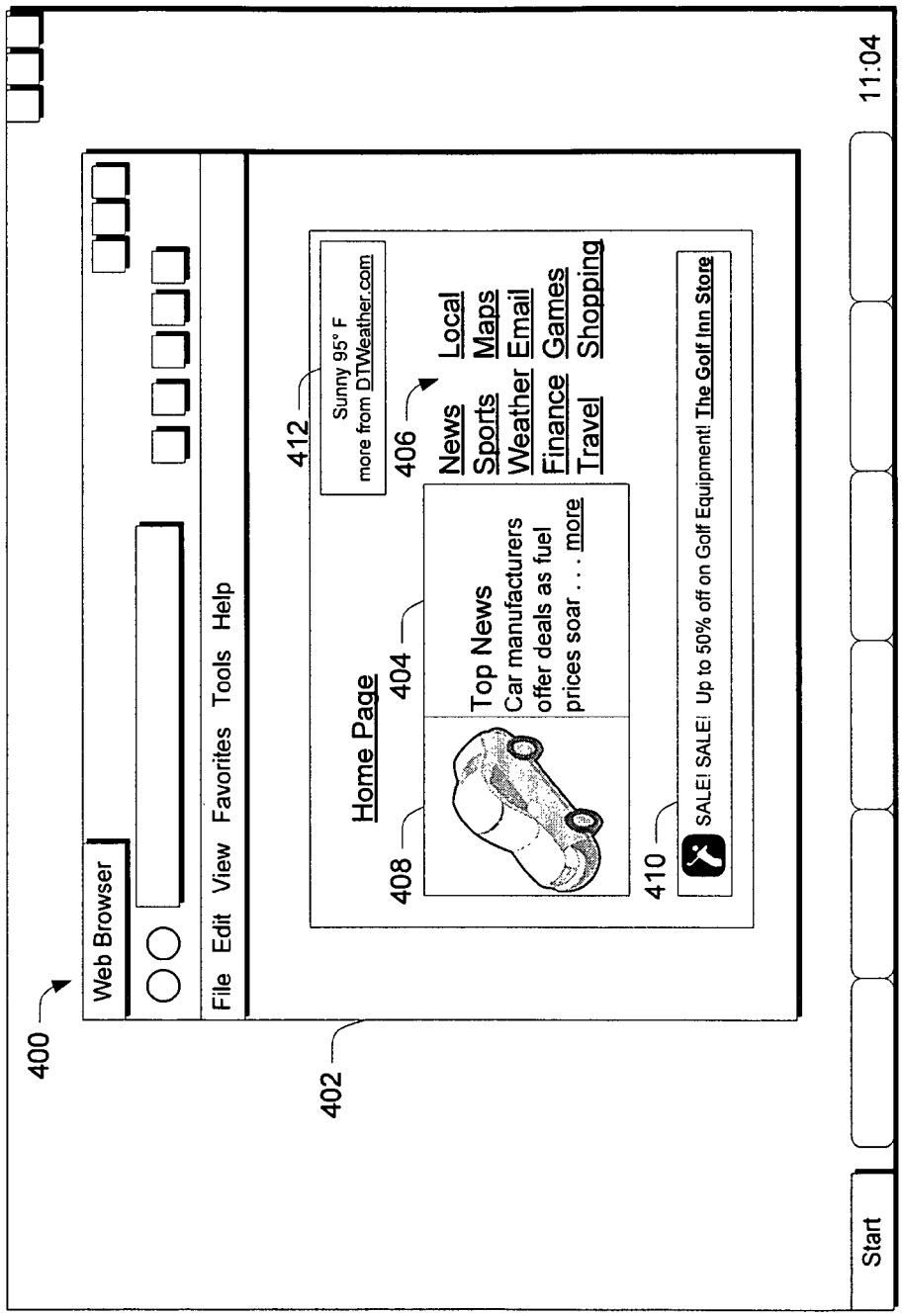
FIG. 4 illustrates a Web browser user interface in accordance with one or more embodiments.

FIG. 4 illustrates a Web browser user interface generally at 400 in which a webpage 402 is depicted as being rendered. The illustrated user interface is but one example of a user interface 116 of FIG. 1 that can be output to enable various user interaction with content available from one or more websites 114. As discussed previously, the presented webpage 402 can include content from a variety of sources, including a primary content source and one or more third party content sources. In the illustrated example, a "Top News" portion 404 and various links 406 represent content from a primary content source, such as a provider of the webpage 402 to which the Web browser has been directed. The car image 408, golf related advertisement 410, and weather plug-in 412 represent content in the webpage 402 that has been obtained from one or more third party content sources.

To render the webpage 402, Web browser can process HTML code associated with the webpage 402. In accordance with techniques described above and below, a suitably configured Web browser can operate to detect potentially risky third party content sources. Such detection can occur at least in part through the processing of HTML code of associated webpages. Responsive to detecting potentially risky content, notification can be output to inform a user and enable actions with respect to the potentially risky content.

Figure 5:
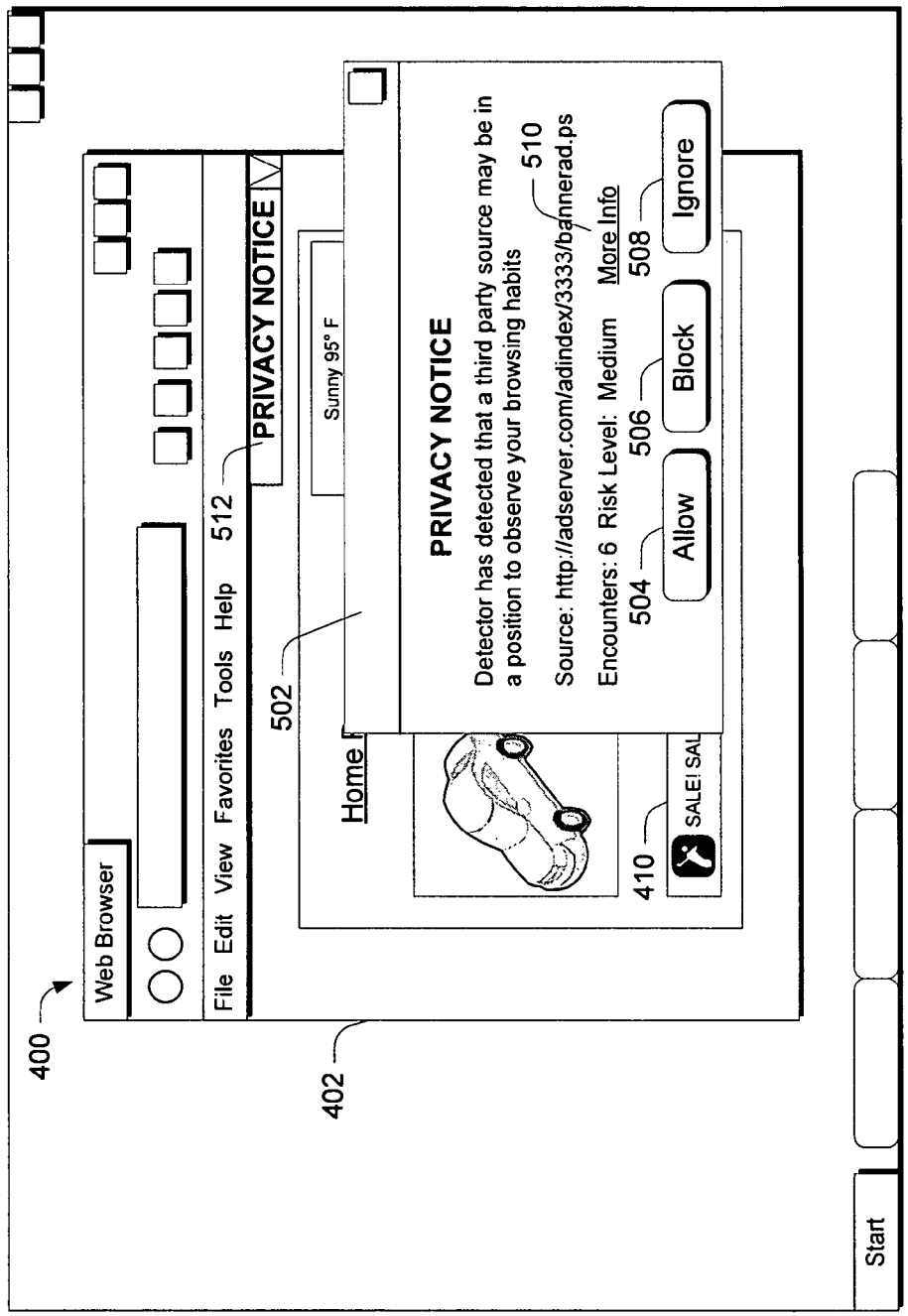
FIG. 5 illustrates a Web browser user interface in accordance with one or more embodiments.

Referring to FIG. 5, the user interface 400 and webpage 402 of FIG. 4 are again depicted. In this example, the Web browser has detected content in the webpage 402 that may pose a privacy risk. Accordingly, notification to inform a user of the potential risk has been output.

The output notification in this case is illustrated as being provided by way of a user interface instrumentality that can be displayed via the Web browser. Any suitable user interface instrumentality can be used to provide such notification. In the illustrated example, the user interface instrumentality is in the form of a pop-up window 502 to display a privacy notice. More particularly, the privacy notice indicates that a "bannerad.ps" content item has been detected as potentially risky. The "bannerad.ps" item in this example corresponds to the golf related advertisement 410, which has been obtained from a third party content source, e.g., "adserver.com". The output of the notification occurs responsive to determining that "adserver.com" has been encountered at multiple different websites visited by a user. For instance, the example privacy notice indicates that there have been "6" encounters and assigns a risk level of "medium". Determining the number of encounters and the assignment of risk level can occur in accordance with counters and various configurable thresholds described herein.

Pop-up window 502 is illustrated as including various examples of selectable portions to enable a user to take action with respect to a third party content source. In particular, the example pop-up window 502 includes an Allow button 504, a Block button 506, an Ignore button 508, and a More Info link 510.

By clicking on the Allow button 504, the user can provide input to cause the "bannerad.ps" item and/or "adserver.com" to be identified as allowed content. One way this can occur is by adding these items to an allowed content control list. Likewise, by clicking on the Block button 506, the user can provide input to cause the "bannerad.ps" item and/or "adserver.com" to be identified as blocked content. Again, this can occur by adding these items to a blocked content control list. By clicking on the Ignore button 508, the user can provide input to ignore the output notification. In this case, the user can defer a decision on the content until another time when the content is again encountered.

The More Info link 510 can provide a mechanism by which a user may obtain more information to inform the user regarding the detected third party content source, and thereby to assist the user in deciding whether to allow or block the third party content source. By selecting the More Info link 510, the Web browser can be redirected to various sources of information regarding potentially risky third party content sources. By way of example, selection of the More Info link 510 by a user can redirect the Web browser to a service that collects and provides information regarding various third party content sources. In another example, selection of the More Info link 510 by a user can redirect the Web browser to a social community site that compiles recommendations from a community of users regarding third party content sources.

In yet another example, selection of the More Info link 510 by a user can redirect the Web browser to a webpage that is provided by the third party content source. In this example, third party content sources can provide functionality through which the third party content sources can provide additional information regarding content that they provide in webpages. One way this can occur is by configuring HTML code associated with content from the third party content source with particular flags, HTML tags, or other suitable data to indicate that additional information available. A path name to cause redirection of a Web browser to the additional information can also be embedded in HTML code for the content. The Web browser can recognize the particular flags, HTML tags, or other suitable data to indicate that additional information available. The Web browser can then construct the More Info link 510 to redirect the Web browser to a path name specified by the third party content source. In this manner, a third party content source is able to assist a user in better understanding the content that is provided by the third party content source, the information that is collected by the third party content source, how information collected by the third party source is used, and so forth. Based at least in part on this information, a user can make an informed decision regarding whether to block or allow content or content sources that are detected as potentially risky FIG. 5 also depicts a menu bar item 512 as another alternate example of a user interface instrumentality suitable to provide a risk notification. Menu bar item 512 can automatically appear in a menu bar of the Web browser responsive to detecting one or more third party content sources that are potentially risky. Menu bar item 512 can appear in addition to or in lieu of other user interface instrumentalities, such as pop-up window 502. Menu bar item 512 can include a drop-down box feature with which a user can interact to obtain information regarding a detected risk. For example, user interaction with Menu bar item 512 can cause display of a privacy notice in a drop-down box that is similar to the information and controls illustrated as being presented in the pop-up window 502.

While examples of a pop-up window 502 and a menu bar item 512 have been discussed, various other user interface instrumentalities through which risk notification can be made are also contemplated. By way of example and not limitation, risk notification can be made by way of a Web browser tab, a Web browser information pane, an operating system message that appears in a toolbar or side bar, and/or any other user interface instrumentality suitable to present risk notifications related to content encountered in webpages. Notification can also be made by other types of communication, such as through instant messages or email. In one or more embodiments, a user can select one or more desired types of notification to receive responsive to detection of potentially risky third party content sources.

Having described various embodiments in which techniques to detect third party content sources that may pose a privacy risk are employed, consider now a discussion of an example system that can be utilized to implement the embodiments described above.

Example System

Figure 6:
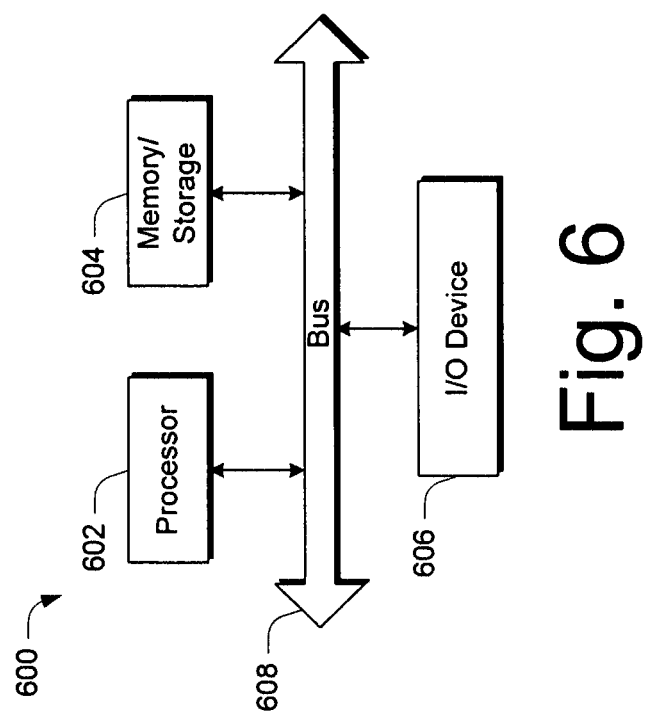
FIG. 6 is a block diagram of a system in accordance with one or more embodiments.

FIG. 6 illustrates an example computing device 600 that can implement the various embodiments described above. Computing device 600 can be, for example, computing device 102 of FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments to enable detection of third party content sources for webpages that may pose a privacy risk have been described herein.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:
1. A computer-implemented method comprising:
receiving HTML code associated with a webpage;
processing the HTML code to identify one or more third parties providing content for the webpage based at least in part upon domain names and file names associated with the content;
for individual identified third parties, storing data to relate a third party to one or more webpages for which the third party provides content;
detecting whether a particular third party is in a position to observe browsing habits of a user according to data stored relative to the particular third party, the data representing a number of times the user has encountered the same particular third party across multiple websites;
responsive to said detecting, assigning one of multiple levels of perceived risk to the particular third party based at least in part upon the data exceeding a configurable threshold value that corresponds to the one of the multiple levels of perceived risk; and
responsive to said detecting, outputting a user interface instrumentality that can enable the user to take one or more actions regarding content from the particular third party.

2. The computer-implemented method of claim 1 wherein said detecting and outputting are performed by a Web browser.

3. The computer-implemented method of claim 1, wherein the user interface instrumentality comprises a pop-up window.

4. The computer-implemented method of claim 1, wherein the user interface instrumentality comprises one or more selectable buttons to enable the user to provide input to specify whether to block or allow the content.

5. The computer-implemented method of claim 1, wherein the user interface instrumentality comprises a selectable link to enable the user to obtain additional information regarding the particular third party.

6. The computer-implemented method of claim 5, wherein the selectable link, when selected, causes a redirection to a website of the particular third party to enable the user to obtain the additional information from the particular third party.

7. The computer-implemented method of claim 1, wherein the detecting comprises incrementing a counter associated with the particular third party each time the particular third party is related to a different webpage across multiple domains to which the user has navigated.

8. The computer-implemented method of claim 1 further comprising:
receiving input from the user via the user interface instrumentality; and
blocking or allowing the content from the particular third party in accordance with the input from the user.

9. A computer-implemented method comprising:
receiving HTML code associated with a webpage;
processing the HTML code to identify a content item from a third party content source to be included in the webpage;
merging a record for the content item with another record for another content item based at least in part upon the content item and the other content item having a sufficiently similar domain name and file name to associate the content item and the other content item with the third party content source;
calculating a number of times content from the same third party content source has been encountered in webpages navigated to by an application across multiple websites;
based at least in part upon a calculated number of times, ascertaining whether the third party content source is in a position to observe browsing habits of the user of the application;
assigning one of multiple different levels of perceived risk to the third party content source based at least in part upon the calculated number of times exceeding a configurable threshold value that corresponds to the one of the multiple different levels of perceived risk; and
providing a user interface instrumentality output configured to facilitate one or more selectable actions regarding the third party content source.

10. The computer-implemented method of claim 9, further comprising responsive to said ascertaining, outputting a user interface instrumentality to notify the user of a detected third party content source.

11. The computer-implemented method of claim 10, further comprising:
presenting the assigned level of perceived risk via the user interface instrumentality output to notify the user of the detected third party content source.

12. The computer-implemented method of claim 10, wherein the user interface instrumentality is in the form of a menu bar item appearing in a menu bar of the application.

13. The computer-implemented method of claim 9, further comprising responsive to said ascertaining, outputting a user interface instrumentality having a plurality of selectable portions to enable the user to take actions with respect to the detected third party content source, the plurality of selectable portions including at least:
a selectable button to block content from the third party content source;
a selectable button to allow content from the third party content source; and
a selectable button to defer a decision on content from the third party content source until a subsequent encounter with content from the same third party content source.

14. The computer-implemented method of claim 9, wherein the application is a Web browser.

15. The computer-implemented method of claim 9, wherein the ascertaining comprises comparing the calculated number of times content from the third party content source has been encountered to multiple threshold values each indicative of one of the multiple levels of perceived risk.

16. A system comprising:
one or more processing devices;
one or more computer readable storage media;
computer readable instructions embodied on the one or more computer readable storage media which, when executed by the one or more processing devices, implement a Web browser that performs operations to:
determine that a content item and another content item are provided by a third party content source based at least in part upon the content item and the other content item having path data that shares a domain name and a file name;
calculate a number of times a third party content source provides content for webpages navigated to by the Web browser that reflects opportunities of the same third party content source across multiple websites to collect browsing data associated with a user based at least in part upon a number of times the third party content source provides the content item or the other content item;
determine when the third party content source is in a position to observe browsing habits of the user based at least in part upon the calculated number of times being within a range of values that correspond to one of multiple different levels of perceived risk, the multiple different levels of perceived risk being assignable to the third party content source; and
output a notification to communicate that the third party content source is in a position to observe browsing habits of the user, the notification including selectable actions regarding the third party content source.

17. The system of claim 16, wherein the Web browser outputs the notification as a pop-up window.

18. The system of claim 16, wherein the Web browser outputs the notification as a menu bar item of the Web browser.

19. The system of claim 16, wherein the notification that is output includes a plurality of selectable portions to enable a user to allow, block, or ignore the third party content source that is determined to be in a position to observe browsing habits.

20. The system of claim 16, wherein the Web browser further performs operations to:
maintain a database describing encounters in webpages with multiple content items from third party content sources, wherein the database is configured to store data to match uniform resource indicators (URIs) of each of said content items with webpages in which the content items are encountered; and
merge content items in the database based at least in part upon similarities in query strings or parameters of said content items to arrive at the calculated number of times the third party content source provides content for webpages.

* * * * *